(12) United States Patent
Stebbins

(10) Patent No.: US 7,698,420 B2
(45) Date of Patent: Apr. 13, 2010

(54) CONSOLIDATING WEB VISITOR BEHAVIOR STATISTICS FOR SALES PROSPECT QUALIFICATION

(76) Inventor: Michael Stebbins, 450 Estrella Dr., Scotts Valley, CA (US) 95066

( * ) Notice: Subject to any disclaimer, the term of this patent is extended or adjusted under 35 U.S.C. 154(b) by 564 days.

(21) Appl. No.: 11/592,834

(22) Filed: Nov. 3, 2006

(65) Prior Publication Data

US 2007/0100996 A1    May 3, 2007

Related U.S. Application Data

(60) Provisional application No. 60/597,008, filed on Nov. 3, 2005.

(51) Int. Cl.
G06F 15/173    (2006.01)
(52) U.S. Cl. .................. 709/224; 709/223; 709/227
(58) Field of Classification Search ............... 709/224, 709/223, 227
See application file for complete search history.

(56) References Cited

U.S. PATENT DOCUMENTS

| | | | | |
|---|---|---|---|---|
| 5,796,952 | A * | 8/1998 | Davis et al. | 709/224 |
| 6,795,856 | B1 * | 9/2004 | Bunch | 709/224 |
| 7,194,466 | B2 * | 3/2007 | Chen et al. | 707/6 |

* cited by examiner

Primary Examiner—Wing F Chan
Assistant Examiner—Ruolei Zong
(74) Attorney, Agent, or Firm—Charles E. Krueger

(57) ABSTRACT

A web data analysis system, computer software product, and method of operation thereof, that uses Internet based data sources, and which operates in an automated manner to collect weighted visitor behavior statistics, and consolidate collected data into a single qualification score to accompany and supplement the entry of web site visitor information for printing, distribution or entry into a sales, prospect or contact management system.

6 Claims, 3 Drawing Sheets

Lead Owner: <u>Steve Cull</u> [Change]
Name: ▌▐▌▐▐▐▌▌▌
Company: ▀▐▐▌▐▐▀▐
▀▀▌▀
Lead Status: Not Yet Contacted
Lead Source:
Lead Type: Optimizer Trial
Customer Type:
Heard At:
Ad Budget:
Page Views/Month:
Date of Capture: 10/6/2005 10:02 AM
Internal ID: 1727
Serial Number: XRFIG SH7SR
68MRF E5AH3
▐▌▌▌▐ ▌▌▌▌L
ELVZE TLAF7
Qualification Score: 430
Time on Site 30 days to DL: 202
Address:
OH
us
IP Address: 12.39.65.2

Created By: <u>Michael Stebbins</u>,
1/6/2005 7:04 AM

FIG. 3

CONSOLIDATING WEB VISITOR BEHAVIOR STATISTICS FOR SALES PROSPECT QUALIFICATION

RELATED APPLICATIONS

This application claims priority from a provisional application entitled SYSTEM AND METHOD FOR CONSOLIDATING WEB VISITOR BEHAVIOR STATISTICS FOR SALES PROSPECT QUALIFICATION, Application No. 60/597,008, filed Nov. 3, 2005, which is hereby incorporated by reference for all purposes.

BACKGROUND OF THE INVENTION

In the rapidly expanding field of e-commerce web sites are increasingly being used as a method of attracting and capturing information from prospects for business. The web site is created on and accessed from a server.

For example, a customer looking to purchase a particular product or service may go to a search engine and enter the name of the product or a company. The search engine will then provide links to web sites where the product may be purchased.

Often web sites include multiple pages which may be linked from a home page which first greets a visitor. The web site will provided some level of interactivity, at a minimum providing forms which can be utilized A common technique for receiving customer information is the use of CGI forms. A CGI form is displayed on the customer's computer by a browser application; the customer fills in data, and then submits the form. Software on the server processes the submitted data and takes appropriate action, for example a response page may be sent to the consumer confirming a transaction or asking for new information.

Other technologies for providing interaction with a web site include AJAX or FLASH which provides for server-client communications without refreshing a web page being presented by the browser.

BRIEF DESCRIPTION OF THE DRAWINGS

FIG. 3 is a screen shot of an embodiment of a user interface.

DETAILED DESCRIPTION OF THE EMBODIMENTS

Overview

As web sites are used to collect information that is voluntarily submitted by a visitor, a web site owner may gain an advantage by understanding each visitor's path and time spent on the website. The ability to analyze and understand a visitor's path and time on important pages gives a business advantage to the web site owner in qualifying prospects for potential business.

Various embodiments of the invention relate to collecting and analyzing of information about a web site visitor. More specifically, various embodiments relates to collecting and analyzing a web site visitor's behavior both before and after "conversion event" which is typically related to submission of personal information from said visitor. Collecting information before a conversion event is practical for qualification of the visitor as a prospect for the sale of goods or services. Collecting information after a conversion event is useful for additional prospect qualification, for example, when a prospect returns to the website and spends more time evaluating a product or service.

DESCRIPTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

A first embodiment of the invention will now be described that utilizes program code executed on a server to monitor the time spent by a user on different web pages of a web site and that calculates a numeric value indicating a web behavior qualification score.

Figure 1:
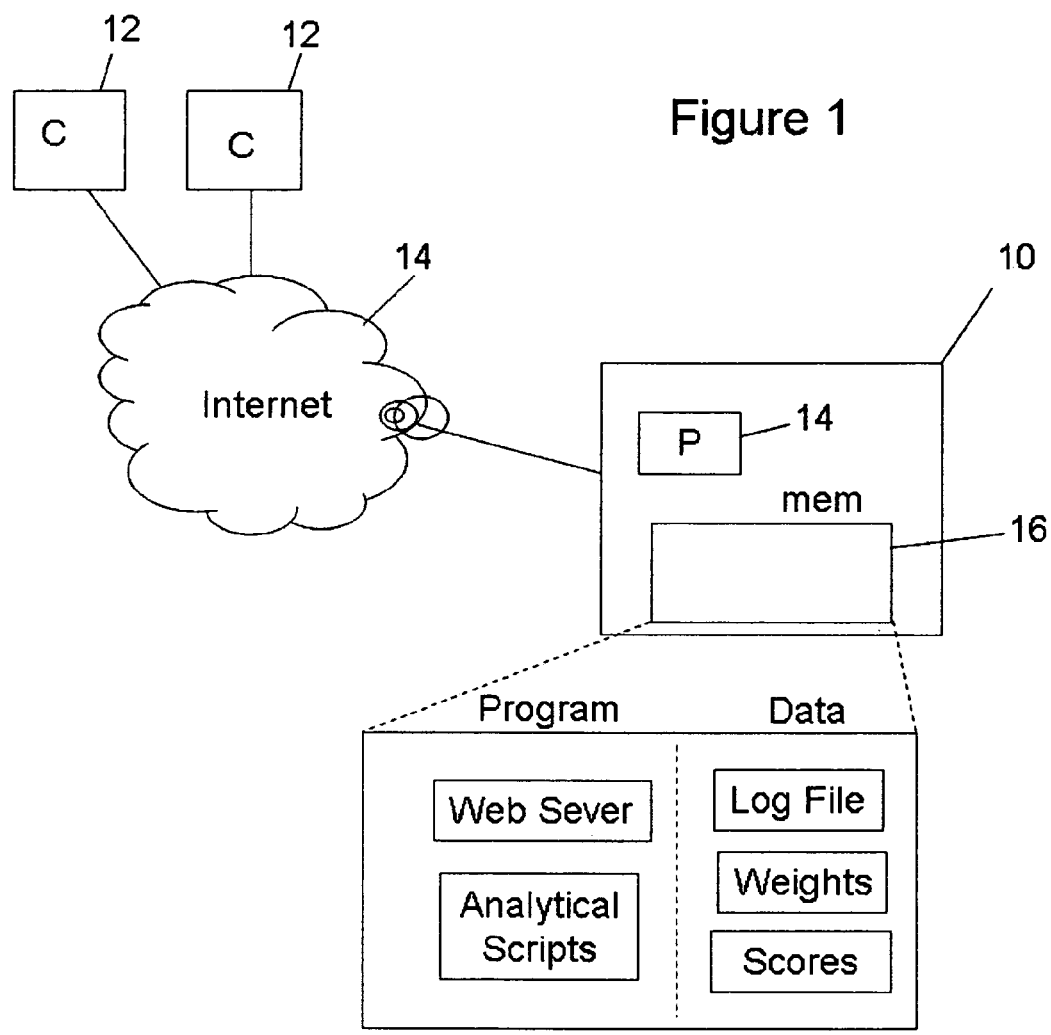
FIG. 1 is a block diagram of an embodiment of the invention.

FIG. 1 is a high level schematic diagram of an embodiment of the invention that depicts a server 10 and a number of clients 12 connected by a network 14, e.g., the internet. The server 10 includes a processor 14, a memory 16, and other components (not shown) that provide network connectivity and a user interface.

The memory stores program code for execution by the processor 14 and data. The program code includes a web server module, and analytical scripts, and other programs and the data includes a web page log file, a table of web page weights, and a table of calculated scores for web site visitors, and other data.

By clicking HyperLinks within each page on the site the visitor navigates from page to page. As the visitor clicks on the links, the web server module records information into a file known as the log file or broadcasts visitor behavior data to another server for collection. The specific format and information that is recorded varies slightly according to the web server software being used and the way the web site is structured, but the following information at least is recorded:

IP Address of client (user)
Date & time of request
Type of request
Type of response from server
URL requested
Referring URL
Cookie information from user
Type of browser used on client An embodiment of the invention will now be described with reference to FIG. 1 and the flow chart of FIG. 2 and Tables I and II. In this example, consider a web site that contains 11 pages:

(1) index.php (2) prodA_info.php (3) prodB_info.php (4) competition.php (5) free_products.php (6) lawsuits.php (7) expensive_products.php (8) ask_for_quote.php (9) pricing.php

(10) buy_now.php

(11) thanks_for_buying.php

In this example, the web site owner wants to sell more of the products described on prodB.php and also knows that people who spend more time on free_products.php lawsuits.php are not good prospects. The owner also knows that visitors that spend more time on the expensive_products.php page tend to buy more in quantity, and thus are more qualified.

In this example embodiment, the web site owner use the analytical script the software to establish and store weighted scores to any number of the pages served in the web site as depicted in TABLE I:

| Score | Page |
|---|---|
| 1 | index.php |
| 2 | prodA_info.php |
| 3 | prodB_info.php |
| 1 | competition.php |
| −2 | free_products.php |
| −3 | lawsuits.php |
| 3 | expensive_products.php |
| 1 | ask_for_quote.php |
| 2 | pricing.php |
| 1 | buy_now.php |
| 1 | thanks_for_buying.php |

Figure 2:
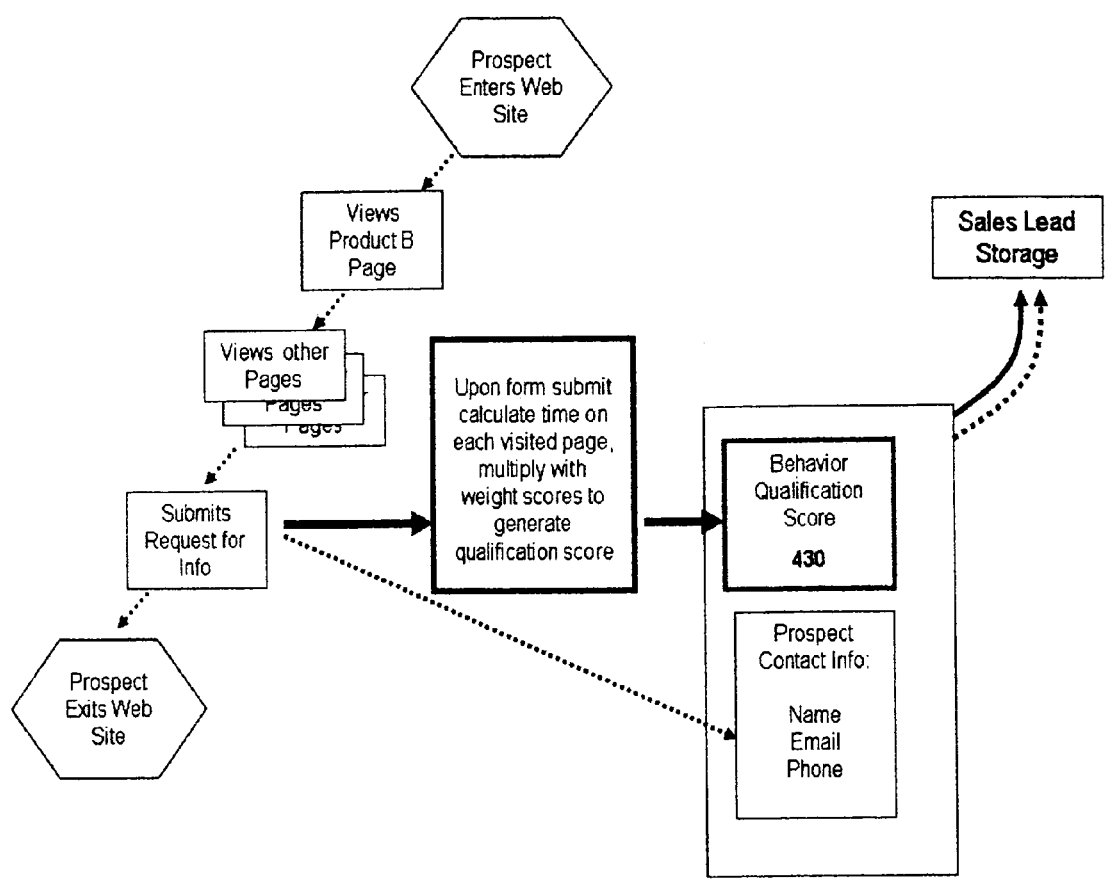
FIG. 2 is a flow chart depicting the operation of an embodiment of the invention.

Referring to FIG. 2, a prospect enters the web site and navigates through various sites. The Web Server module collects data regarding the times spent on each page and stores the data in the log file.

When the user submits a form, an analytical script utilizes the data stored in the log file to calculate the time the prospect spent on each visited page. Upon submission of data, each visitor's path is collected and annotated with time spent on each page as depicted in TABLE II:

| | Visitor #1 | | Visitor #2 |
|---|---|---|---|
| Time | Page | Time | Page |
| 16 | index.php | 16 | index.php |
| 7 | prodA_info.php | 65 | prodA_info.php |
| 65 | prodB_info.php | 7 | prodB_info.php |
| 15 | competition.php | 15 | competition.php |
| 17 | free_products.php | 45 | free_products.php |
| 0 | lawsuits.php | 0 | lawsuits.php |
| 45 | expensive_products.php | 17 | expensive_products.php |
| 15 | ask_for_quote.php | 15 | ask_for_quote.php |
| 37 | pricing.php | 37 | pricing.php |
| 0 | buy_now.php | 0 | buy_now.php |
| 0 | thanks_for_buying.php | 0 | thanks_for_buying.php |
| | Total Time: 202 | | Total Time: 202 |

In this example, both visitors spend an equal amount of time on the site. The analytical script, in this embodiment, multiplies the time spent on a page by the weight assigned to the page, retrieved from the table of web page weights, to form a product value for each page for each visitor. The product values are then summed for each visitor to obtain a web behavior qualification score.

In the case of Visitor #1, the prospect is annotated with a score of 430. Visitor #2, while spending an equal amount of time on the web site was annotated with a qualification score of 130. This scoring system allows the web site owner to sort and select prospects based on web site behavior, and becomes especially valuable in a situation where there is a high quantity of leads.

FIG. 3 depicts an example of a user interface where a qualification score is added to typical prospect contact data.

The invention may be implemented as program code, stored on a computer readable medium, that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. For example, in the described embodiments an assigned weight is multiplied by the time spend on a page to generate the score. Other statistical techniques can also be applied to score the visitor, for example the weights can be utilized in algebraic equations to determine a score. Further, the division of functions between the various software modules is presented by way of example, not limitation, and other software techniques can be utilized as understood by persons of skill in the art. Accordingly, it is not intended to limit the invention except as provided by the appended claims.

What is claimed is:

1. A method for collecting information regarding a website, wherein the website is provided by a server connected to a communication network, and the server includes a processor connected to a memory, the method comprising:

assigning and storing, by the server, in a table of web page weights within the memory a weighted score for each of a plurality of web pages on a web site;

collecting, by the server, and recording in a web page log file within the memory, a list of pages included in the plurality of web pages, visited by a web site visitor;

determining, by an analytical script in the memory, an amount of time the web site visitor spends on each page visited in the plurality of web pages;

calculating a rating number based on the weighted score assigned to and the amount of time spent on each web page visited;

associating the rating number for the web site visitor with contact information collected about the web site visitor;

wherein the calculating comprises:

multiplying the amount of time spent on each page by the weighted score assigned to the page to form a product value for each page;

summing the product value for each page visited to determine the rating number.

2. The method of claim 1 further comprising:

outputting the information collected and rating number for the web site visitor.

3. A computer readable program encoded in one or more computer-readable storage media, the computer readable program code configured to instruct a computer unit to perform the following steps:

assigning a weighted score to each of a plurality of web pages on a web site;

collecting a list of pages, included in the plurality of web pages, visited by a web site visitor;

determining an amount of time the web site visitor spends on each page visited in the plurality of web pages;

calculating a rating number based on the weighted score assigned to and the amount of time spent on each web page visited;

associating the rating number for the web site visitor with contact information collected about the web site visitor;

wherein the calculating comprises:

multiplying the amount of time spent on each page by the weighted score assigned to the page to form a product value for each page;

summing the product value for each page visited to determine the rating number.

4. The computer readable program code of claim 3 further configured to:

output the information collected and rating number for the web site visitor.

5. A web server comprising:

a processor connected to a memory containing at least one analytical script stored therein;

wherein the analytical script is configured to instruct the processor to assign a weighted score to each of a plurality of web pages on a web site;

collect a list of pages, included in the plurality of web pages, visited by a web site visitor;

determine an amount of time the web site visitor spends on each page visited in the plurality of web pages;

calculate a rating number based on the weighted score assigned to and the amount of time spent on each web page visited;

associate the rating number for the web site visitor with contact information collected about the web site visitor;

wherein the calculating comprises:

multiplying the amount of time spent on each page by the weighted score assigned to the page to form a product value for each page;

summing the product value for each page visited to determine the rating number.

6. The web server of claim 5, wherein the analytical script is further configured to instruct the processor to:

output the information collected and rating number for the web site visitor.

* * * * *